No. 666,991. Patented Jan. 29, 1901.
H. WOLFE & C. T. CLARKE.
WAGON BRAKE.
(Application filed July 14, 1900.)
(No Model.) 2 Sheets—Sheet 1.
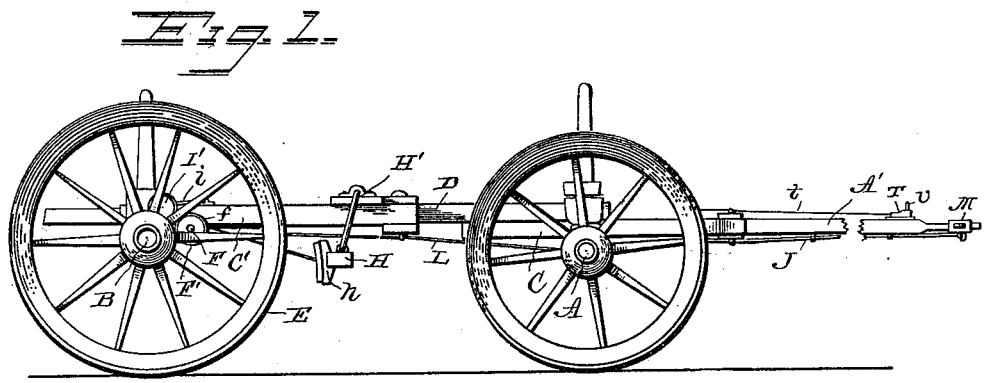
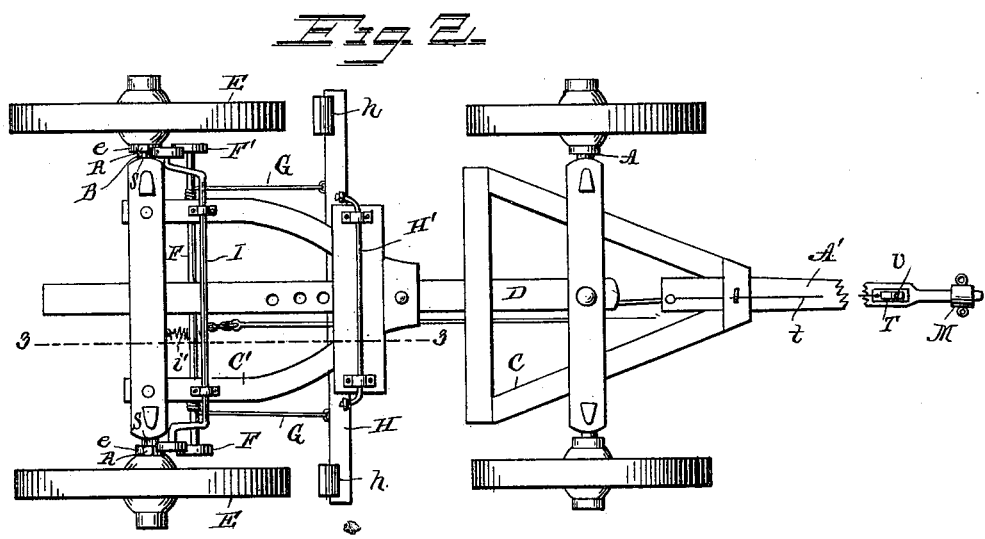
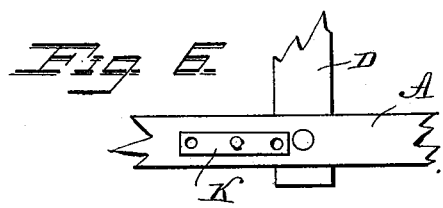
Witnesses
Herbert Wolfe, and
Charles T. Clarke,
Inventors,
by John J. Thomas & Co.,
Attorneys No. 666,991. Patented Jan. 29, 1901.
H. WOLFE & C. T. CLARKE.
WAGON BRAKE.
(Application filed July 14, 1900.)
(No Model.) 2 Sheets—Sheet 2.
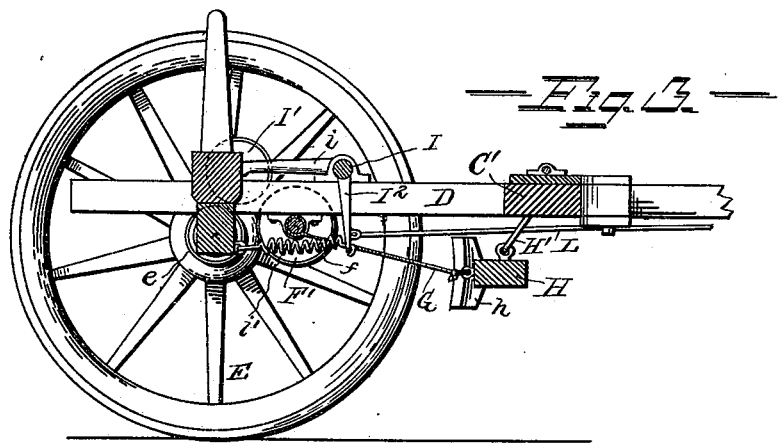
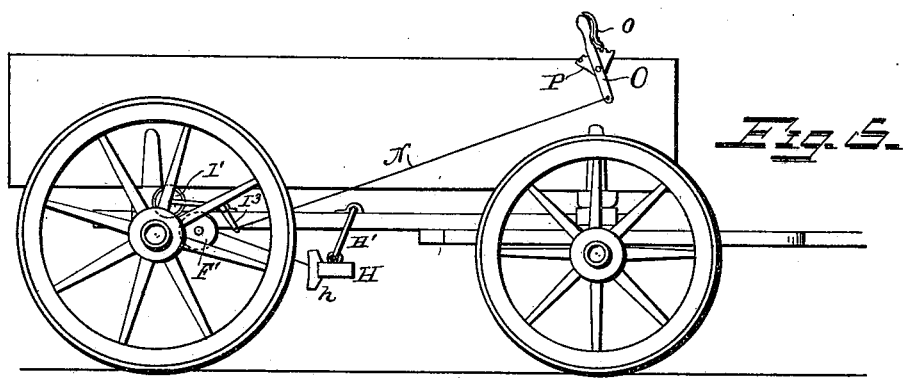
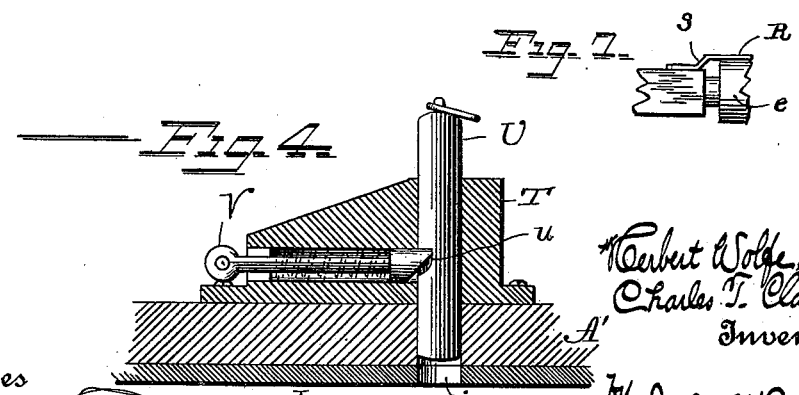
Witnesses
Herbert Wolfe and
Charles T. Clarke,
Inventors,
by John B. Thomas & Co.,
Attorneys.

UNITED STATES PATENT OFFICE.

HERBERT WOLFE AND CHARLES T. CLARKE, OF PINCKNEYVILLE, KENTUCKY.

WAGON-BRAKE.

SPECIFICATION forming part of Letters Patent No. 666,991, dated January 29, 1901.

Application filed July 14, 1900. Serial No. 23,649. (No model.)

*To all whom it may concern:*

Be it known that we, HERBERT WOLFE and CHARLES T. CLARKE, citizens of the United States of America, residing at Pinckneyville, in the county of Livingston and State of Kentucky, have invented new and useful Improvements in Wagon-Brakes, of which the following is a specification.

This invention is an improvement in brake mechanism for wagons or vehicles; and the object of the invention is to provide peculiar mechanism for forcibly applying the brake-shoes through the intervention of power derived from the rear wheels of the vehicle, the said mechanism being thrown in and out of operation either by a hand-lever located within easy reach of the driver's seat or automatically by means of certain devices extending to the outer end of the tongue and actuated by the pull-back chains connected to the horse-collars, provision being also made to lock the aforesaid automatic devices to permit the vehicle to be backed by the horses.

With the above object in view the invention consists of a swinging beam suspended from the running-gear of the vehicle and carrying the brake-shoes, a shaft or drum having a chain or rope wound thereon and connected to the swinging brake-beam, friction-wheels mounted on the ends of said shaft or drum, and a rocking crank-shaft carrying friction-rollers adapted to be brought against the aforesaid friction-wheels and inner hub-bands of the rear wheels of the vehicle, thereby to turn the drum and operate the brakes, together with devices for operating said crank-shaft.

The invention also consists in the particular construction and arrangement of detail parts and their combination, all as hereinafter fully described, and specifically set forth in the appended claims.

In the accompanying drawings, which form a part of this specification, and in which like letters of reference indicate like parts throughout the several views, Figure 1 is a side elevation illustrating the application of our invention to a wagon. Fig. 2 is a plan view. Fig. 3 is a sectional view on the line 3 3 of Fig. 2. Fig. 4 is an enlarged detail sectional view of the device located at the outer end of the tongue of the wagon. Fig. 5 is a side elevation showing a hand-lever device for operating the crank-shaft. Fig. 6 is a detail view showing the lever to which the connecting-rods are connected. Fig. 7 is a detail view of one of the scrapers.

Referring to said drawings, A and B designate the front and rear axles of the wagon, which are connected together by the hounds C and C' and reach-bar D. In carrying out our invention the hubs of the rear wheels E are provided at their inner ends with friction-bands $e$, and to the under side of the rear hound C' is journaled a transverse shaft F, on the outer ends of which are mounted and made fast friction-wheels F' F', provided with peripheral friction-bands $f$. The central portion of the shaft F forms a drum, around which are wound flexible connections or chains G, extending forwardly therefrom and secured to the brake-beam H. Said brake-beam is supported from the rear hounds by means of a bail H', permitting said brake-beam to have a swinging movement to and from the rear wheels, so that the shoes $h$ may be brought into contact with the same.

Mounted upon the rear hounds above the shaft F is a crank-shaft I, the end crank portions $i$ of which carry at their ends friction-rollers I'. This crank-shaft is so located that the friction-rollers I' are adapted to be brought into contact with both the friction-wheels F' and the band $e$ on the hubs of the rear wheels of the wagon, and it will be readily noted that by rocking the crank-shaft this engagement of the parts will be effected; also, that when the rollers are in contact with the wheels and hubs the turning of the rear wheels of the wagon will transmit power to the shaft F, causing said shaft to wind the chain thereon and draw upon the brake-beam to bring the shoes forcibly against the tires of said rear wheels, thereby retarding their movement and forming an effectual brake. The friction-wheels F' are disposed near the bands $e$ on the hubs of the rear wheels, but out of contact therewith, being geared to said hubs by the rollers I', as hereinbefore stated. Therefore the application of the brakes is governed by the crank-shaft, said crank-shaft being operated in the manner hereinafter described.

In order to provide for applying the brakes automatically by the backing of the team of draft-animals, a push-bar J extends along the under side of the tongue A' and is connected at its inner end to one end of a centrally-pivoted short lever K, to the other end of which lever is attached a rod L, extending from an arm I², depending from the central portion of the crank-shaft I. The push-bar is connected at its outer end to a casting M, which is slidably mounted upon the outer end of the tongue, and to said casting or slide the pull-back chains are secured to actuate the same.

The operation of applying the brakes through the intervention of the devices just described is effected by the team pulling upon the backing-chains, causing a rearward movement of the slide M, which pushes upon the bar J, and said bar being attached to one end of the lever K moves the other end thereof forward, exerting a pull upon the rod L, and said rod being connected to the crank-shaft I rocks the same, moving the rollers I', carried thereby, into contact with the hub-bands e and friction-wheels F', the latter turning the shaft or drum to wind the brake-chains thereon and apply the brakes. This provides a very effective means for throwing the brake mechanism into operation, and being controlled by the backing-chains a too-rapid movement of the vehicle downhill will automatically apply the brakes, inasmuch as the vehicle proceeding faster than the horses will cause a rearward movement of the slide. When the slide is released, the crank-shaft is returned to its normal position by a helical spring i', attached to the depending arm I² and to the rear axle.

It is apparent that the brake mechanism could be thrown into operation by a hand-lever, as illustrated in Fig. 5 of Sheet 2 of the drawings. In this modification the arm I³ of the crank-shaft is located near one end of said shaft and is connected by a rod N to a hand-lever O, pivoted to a side of the wagon-body, the said lever having a pawl o, adapted to engage a segment-rack P for the purpose of holding said lever when the brake is applied. This operating device may be found desirable in connection with some styles of wagons, though it will be found preferable to use the automatic devices.

Scrapers R are provided for removing dirt which may accumulate on the rear hub-bands e, the said scrapers being attached to the free ends of flat springs S, secured to the rear axle. These scrapers keep the said hub-bands free and clean, so as to insure the proper frictional engagement of the rollers I' therewith.

It will be noted that a backward pull upon the backing-chains will quickly and positively apply the brakes, and in order that this mechanism may not interfere with the backing of the wagon at any time a device is provided for holding the push-bar J against movement, the said device being adapted to be thrown into and out of engagement with said bar. To this end a block T is secured upon the tongue a suitable distance in the rear of the slide M, and extending through this block vertically is a pin U, the said pin also passing through the tongue and is adapted to pass into an opening j of the push-bar to lock the latter against movement. The hole in the push-bar registers with the pin when said push-bar is at the limit of its forward movement, so that said pin will prevent a rearward movement thereof. The pin is held normally elevated out of engagement with the push-bar by means of a spring-bolt V, engaging a notch u in said pin, and the spring-bolt is retracted by means of a pull-cord t, extending along the upper side of the tongue to the inner end of the same. By this attachment the wagon can be backed without applying the brakes.

The improved brake mechanisms herein shown and described form a very simple and effective means for applying the brake-shoes, and as it consists of but few parts securely connected to each other there will be a positive operation. When the friction-rollers are brought firmly against the hub-bands and friction-wheels, the brake-shoes will be forcibly applied to the tires of the rear wheels and by easing up on the crank-shaft the shoes can be eased off. In other words, the brakes can be applied with the same degree of force as in the usual manner of applying brakes.

The operative parts of the improved brake mechanism are out of the way, so as not to interfere with the ordinary uses to which the wagon may be put, and when applied to a lumber-wagon the rear end of the rod L may be provided with a chain, as shown in Fig. 2, to permit the adjustment of said rod when the wagon is lengthened or shortened.

Having thus described our invention, what we claim as new, and desire to secure by Letters Patent, is—

1. A wagon-brake, comprising a shaft supported adjoining one of the axles of the wagon, friction-wheels on said shaft, a rocking shaft having rollers adapted to engage the friction-wheels and hub-bands of the wheels of the wagon, and means for operating said rocking shaft; together with the brake-beam connected to the shaft which carries the friction-wheels, substantially as shown and described.

2. In a wagon-brake, the combination, of a shaft or drum supported adjoining one of the axles of the wagon, friction-wheels on said shaft or drum, a crank-shaft carrying rollers at the ends of the crank portions thereof, said rollers being adapted to engage the friction-wheels and bands on the hubs of the wagon-wheels, and means for rocking the crank-shaft; together with the brake-beam, and a chain attached to said brake-beam and wound upon the shaft or drum, substantially as shown and described.

3. In a wagon-brake, the combination, of a shaft or drum supported adjoining the rear axle of the wagon, friction-wheels on said shaft or drum, a crank-shaft carrying rollers at the ends of the crank portions thereof, said rollers being adapted to engage the friction-wheels and bands on the hubs of the wagon-wheels, an arm depending from the crank-shaft, a rod connected to said arm, and means for operating said rod; together with the brake-beam, a chain attached to said brake-beam from the shaft or drum, and a spring returning the crank-shaft to its normal position.

4. In a wagon-brake, the combination, of a shaft or drum supported adjoining the rear axle of the wagon, friction-wheels on said shaft or drum, a crank-shaft carrying rollers at the ends of the crank portions thereof, said rollers being adapted to engage the friction-wheels and bands on the wagon-wheels, an arm depending from the crank-shaft, a rod connected to said arm, a lever to which the rod is also connected, and means for operating said lever; together with the brake-beam, and a chain connecting the brake-beam to the shaft or drum, substantially as shown and described.

5. In a wagon-brake, the combination, of a shaft or drum supported adjoining the rear axle of the wagon, friction-wheels on said shaft or drum, a crank-shaft carrying rollers at the ends of the crank portions thereof, bands on the hubs of the rear wheels with which the rollers engage, an arm depending from the crank-shaft, a rod connected to said arm, a lever to which the rod is also connected, a push-bar supported by the tongue of the wagon and connected to said lever, and a slide to which the push-bar is attached, the said slide being mounted on the outer end of the tongue and adapted to have the pull-back chains attached thereto; together with the brake-beam, and chain connecting said brake-beam to the shaft or drum, substantially as shown and described.

6. In a wagon-brake, the combination, of a shaft or drum supported adjoining the rear axle and having friction-wheels, a crank-shaft carrying friction-rollers adapted to engage the friction-wheels and bands on the rear wheels of the wagon, an operating-rod connected to the crank-shaft and to a bar extending along the tongue of the wagon, a slide to which said bar is attached, the bar having a hole or opening therein, a pin adapted to engage said hole or opening in the bar, and a spring-bolt engaging a notch in the pin to hold the same elevated; together with the brake-beam, and a chain connecting the same to the shaft or drum, substantially as shown and for the purpose set forth.

In testimony whereof we affix our signatures in presence of two witnesses.

HERBERT WOLFE.
CHARLES T. CLARKE.

Witnesses:
G. H. RAPPOLEE,
DICK CRICHLOW.